(12) United States Patent
Kitagawa et al.

(10) Patent No.: US 6,328,657 B1
(45) Date of Patent: Dec. 11, 2001

(54) THREADED FASTENER AND A METHOD OF MAKING SAME

(75) Inventors: Masayoshi Kitagawa, Kishiwada; Yoshisada Michiura, Izumisano; Keiichi Maekawa, Osaka; Mitsuaki Kohara, Kishiwada; Kenji Higashi, Tondabayashi; Takeyuki Asaoka, Sakai, all of (JP)

(73) Assignees: Kurimoto, Ltd.; Kishiwada Stainless Steel Works; Kenji Higashi, all of Osaka (JP)

(*) Notice: Subject to any disclaimer, the term of this patent is extended or adjusted under 35 U.S.C. 154(b) by 0 days.

(21) Appl. No.: 09/535,752

(22) Filed: Mar. 27, 2000

(30) Foreign Application Priority Data

Mar. 29, 1999 (JP) .................................................. 11-085504
Feb. 10, 2000 (JP) .................................................. 12-033201

(51) Int. Cl.$^7$ ............................................ B21H 3/02; B23G 9/00
(52) U.S. Cl. .................................... 470/17; 470/9; 470/10; 470/11
(58) Field of Search ............................. 470/8, 9, 10, 11, 470/12, 16, 17; 148/406, 420, 666, 667, 907; 72/700

(56) References Cited

U.S. PATENT DOCUMENTS 3,222,227 * 12/1965 Baugh et al. ............................ 72/700
3,490,263 * 1/1970 Pashak .................................... 72/700
4,108,691 * 8/1978 Stowell et al. ......................... 72/377
6,151,198 * 11/2000 Prater et al. ........................ 360/265.7

FOREIGN PATENT DOCUMENTS 3-294036 * 12/1991 (JP) ...................................... 72/377

* cited by examiner

Primary Examiner—Ed Tolan
(74) Attorney, Agent, or Firm—Antonelli, Terry, Stout & Kraus, LLP

(57) ABSTRACT

A threaded fastener lighter in weight and easier to produce is made by the moderate temperature-forging, from a raw magnesium material that contains microcrystals whose diameter is about 100 μm or less. The raw material may be pure magnesium of industrial grade in one case, and alternatively be any magnesium alloy or such a composition as comprising as its matrix the alloy or pure magnesium, in the other cases. The raw material has a superplastic property and a fine-granulated metallographic internal texture, and when making the fastener, will be heated to 250–400° C. at which superplasticity takes place to facilitate the forging to form the fastener. A method proposed in the invention to make the fastener is thus such that the number of necessary processing steps is reduced and manufacture cost is lowered.

10 Claims, 2 Drawing Sheets

THREADED FASTENER AND A METHOD OF MAKING SAME

FIELD OF THE INVENTION

The present invention relates to a threaded fastener and a method of making it, wherein the fastener is rendered lighter in weight and more efficient to produce so that the number of processing steps is reduced to lower manufacture cost.

PRIOR ART

Recently, automobiles, household electric devices and apparatuses, office-automation (viz., 'OA') apparatuses and the like are all required to be as light as possible. In this connection, magnesium alloys are attracting attentions in the industries because they as a principal material forming those apparatuses are generally of a relatively low specific gravity and high specific strength. Thus, bolts, nuts and the like articles for assembling those apparatuses are also required to be lighter in weight.

However, magnesium alloys easy to mold and cut are chemically so active that dusts and chips produced during machining or cutting magnesium alloy articles are highly inflammable. Process control for and safety assurance of the alloys are not necessarily easy, thus rendering it problematic to mechanically treating with the magnesium alloys. In addition, the highly close-packed (viz., 'hcp') structure of magnesium microcrystals has made it considerably difficult to carry out processes for plastically deforming them at room temperatures.

JIS (viz., Japanese Industrial Standards) prescribes some ductile magnesium alloys of the types: 'AZ31', 'AZ61', 'AZ80' and 'ZK60', but applicants are not aware of any prior use of these alloys to make threaded fasteners for the reasons just mentioned above.

SUMMARY OF THE INVENTION

The present inventors have conducted researches and studies on pure magnesium of industrial grade and certain alloys thereof that had a superplastic fine-granulated metallographic (i.e., metallurgical) internal texture and showed superplasticity within a special range of temperatures. As a result, it has been found that threaded fasteners could be manufactured well by forging pure magnesium or its alloys at room temperatures, if their chemical composition as well as the size of their microcrystals and the processing temperature were restricted such that superplasticity would take place.

Objects of the present invention, that was made on the basis of such a surprising effect, are thus to provide a threaded fastener lighter in weight and easier to manufacture and also to provide a novel method of inexpensively making the fastener by a shortened process.

To achieve these objects, a threaded fastener provided herein will be produced by the moderate temperature-forging process, using a raw material selected from the group consisting of pure magnesium of industrial grade, magnesium alloys of a superplastic and fine-granulated texture, first composite materials whose matrix is pure magnesium, and second composite materials whose matrix is any of the magnesium alloys.

The temperature-forging is to be done at a raised moderate temperature falling within such a range of about 250–400° C. that superplasticity takes place, and using the raw material composed of microcrystals having an average diameter of 100 $\mu$m or less, whether material is pure magnesium of industrial grade or any of those fine-textured superplastic magnesium alloys or any of the composite materials whose matrix is pure magnesium or the alloy thereof.

Preferably, the magnesium alloys having such a superplastic fine-granulated metallographic texture may each be composed substantially of 1.0–12.0% by weight of aluminum (viz., Al), 0.3–2.5% by weight of zinc (viz., Zn), 0.2–0.3% by weight of manganese (viz., Mn), a balance of magnesium (viz., Mg) and unavoidable impurities contained therein. Alternatively, the magnesium alloys having such a superplastic fine-granulated metallographic texture may each be composed substantially of 2.0–8.0% by weight of Zn, 0.1–1.0% by weight of zirconium (viz., Zr), a balance of Mg and unavoidable impurities contained therein.

The composite materials whose matrixes are fine-granulated magnesium or its alloys of the superplastic texture are of improved mechanical strength, abrasion resistance and other properties. Ingredients for reinforcing the composite materials may be certain fibers or particles dispersed therein. Examples of such fibers and particles are: carbon fibers, glass fibers, whiskers, oxides, carbides, nitrides and the like.

The reasons for the above chemical composition of the magnesium alloys are as follows. Pure magnesium suffices if the threaded fastener need only be lightened in weight, whereas the magnesium alloys or composite materials whose matrix are any of the alloys are more preferable if the fastener must be of a higher strength in certain uses.

Each magnesium alloy consists of solid-solution elements, high-melting elements and a balance of Mg. Examples of the former elements are Zn and Al that are contained as rich as ensuring the solid-solution condition so as to miniaturize microscopic units (eutectic cells) in their finished fine metallurgical tissue. An excessive content of Zn or Al exceeding the upper limit discussed above will undesirably impair ductility and toughness of the alloys. Examples of the high-melting elements are Mn and Zr that will serve as pinning particles for stabilization of crystalline granules at elevated temperatures. In general, size of each pinning particle is 1 $\mu$m (one micrometer) or less. Richer contents of the high-melting elements will give a higher stabilization effect, but an excessive amount of them will make coarser the pinning particles and undesirably impair ductility and toughness of the alloys at room temperatures.

It is preferable that microcrystals have as small a diameter as possible in the raw material that may be pure magnesium, any of its superplastic and fine-granulated alloys, or any of composite materials whose matrix are pure magnesium or any of the magnesium alloys. If the diameter is 100 $\mu$m or less, then superplasticity will appear at temperatures raised to about 250–400° C. More preferably, the diameter may be 80$\mu$m in or less.

Next, the method of making a threaded fastener if of the folowing nature. Namely, the method is characterized in that the raw material selected from the group as below is heated to a temperature at which the material shows superplasticity when the fastener is formed by the moderate temperature-forging.

In detail, characteristic feature of the method is that the superplastic fine-granulated metallographic raw material forged at a moderate temperature is composed of microcrystals having a diameter of 100 $\mu$m or less, wherein the forging is carried out at a temperature falling within such a range of about 250–400° C. that superplasticity takes place.

The raw material used in this method has to be such as pure magnesium of industrial grade, a first kind of magnesium alloy, a second kind of magnesium alloy or any composite material whose matrix is any one of these magnesium and its alloys. The first kind of magnesium alloy is substantially composed of 1.0–12.0% of Al, 0.3–2.5% of Zn, 0.2–0.3% of Mn, a balance of Mg and unavoidable impurities contained therein (all '%' values being 'by weight' hereinafter). The second kind of magnesium alloy is substantially composed of 2.0–8.0% by of Zn, 0.1–1.0% of Zr, a balance of Mg and unavoidable impurities contained therein. Any of these materials will be heated to 250–400° C. so as to make use of its superplasticity when moderate temperature-forging it into any desired shape of the fasteners.

Magnesium is of a relatively high thermal conductivity (being about twice that of iron). Therefore, the raw material (whether wire-shaped or rod-shaped) preliminarily heated to the above temperature will inevitably be cooled down to or below 100° C., by a forming punch and die at the first forging step for forming a bolt head. If a second forging step has to be done after the first step, the raw material must be heated again to and kept at 250–400° C. The following and final steps may be conducted using the forming die kept at 250° C. or higher so as to enable a continuous process to bring the raw material into a desired finished shape. The forming punch mating with the die may also preferably be heated to and kept at a similar temperature. Any screw thread may be formed by the rolling technique at a temperature that also falls within a similar range of temperatures.

THE PREFERRED EMBODIMENTS

Some preferable modes of the present invention will be described.

Figure 1:
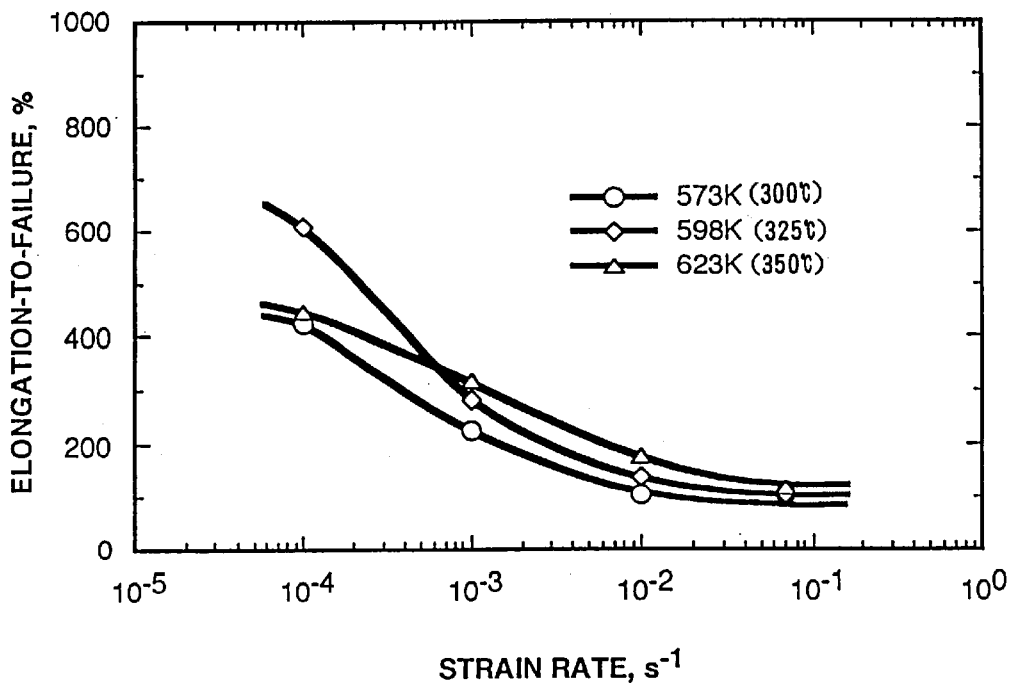
FIG. 1 is a graph showing a relationship strain rate and elongation-to-failure of a magnesium alloy used in the present invention.
Figure 2:
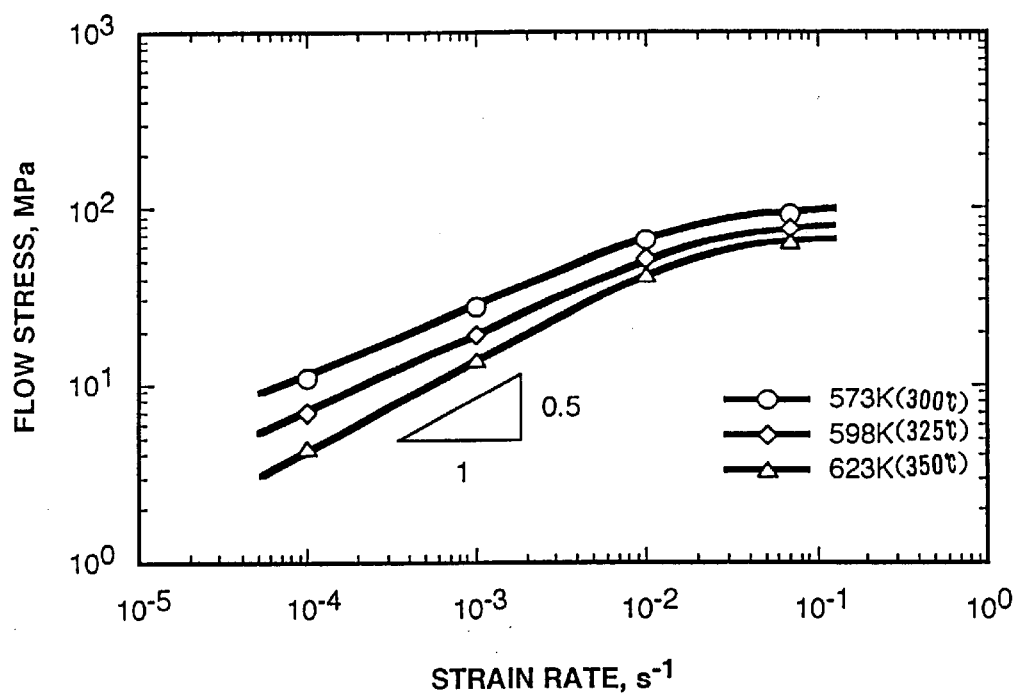
FIG. 2 is a graph showing a relationship strain rate and flow stress of the magnesium alloy.

Between strain rate and elongation-to-failure (i.e., yielding elongation), a relationship shown in FIG. 1 was found by testing at a temperature of 300–350° C. some specimens of a magnesium alloy substantially composed of 3.1% of Al, 1.1% of Zn, 0.21% of Mn and a balance of Mg. This fine-granulated superplastic alloy had an average microcrystal diameter of 10 μm or less. FIG. 2 shows a relationship between strain rate and flow stress, also detected at that temperature.

Elongation-to-failure decreased, as strain rate increased in a manner seen in FIG. 1. However, elongation of 100–200% was observed even at $10^{-2}$ $sec^{-1}$, indicating good processibility of the alloy. FIG. 2 will make it apparent that the higher the temperature, the lower is the flow stress in the alloy specimens at each strain rate, giving higher processibility.

Figure 3:
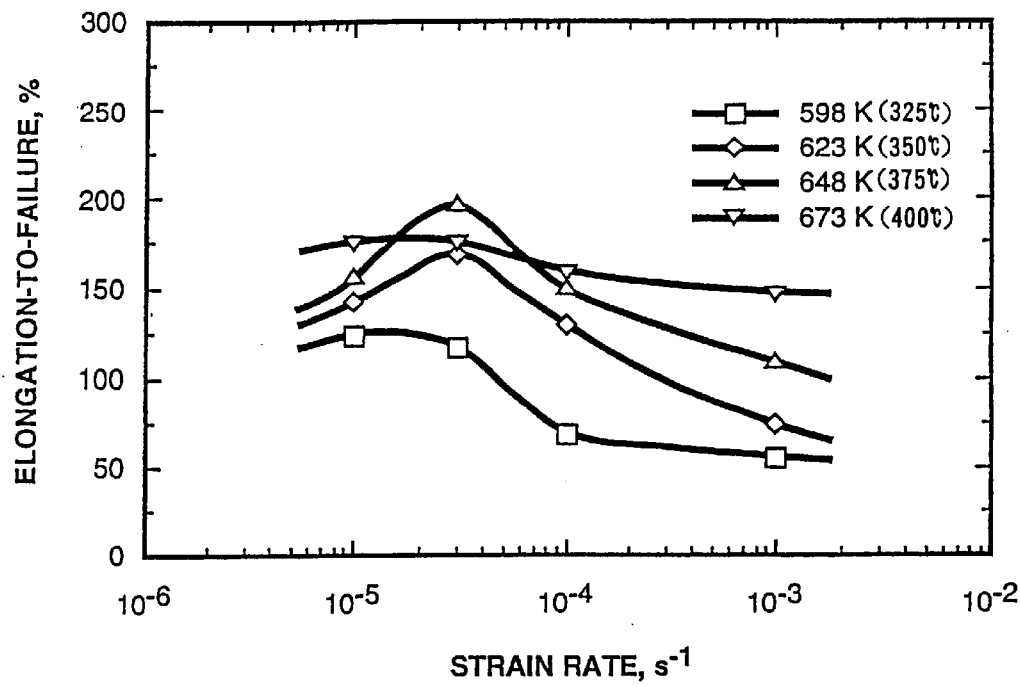
FIG. 3 is a graph showing a relationship strain rate and elongation-to-failure of a further magnesium alloy used in the present invention.
Figure 4:
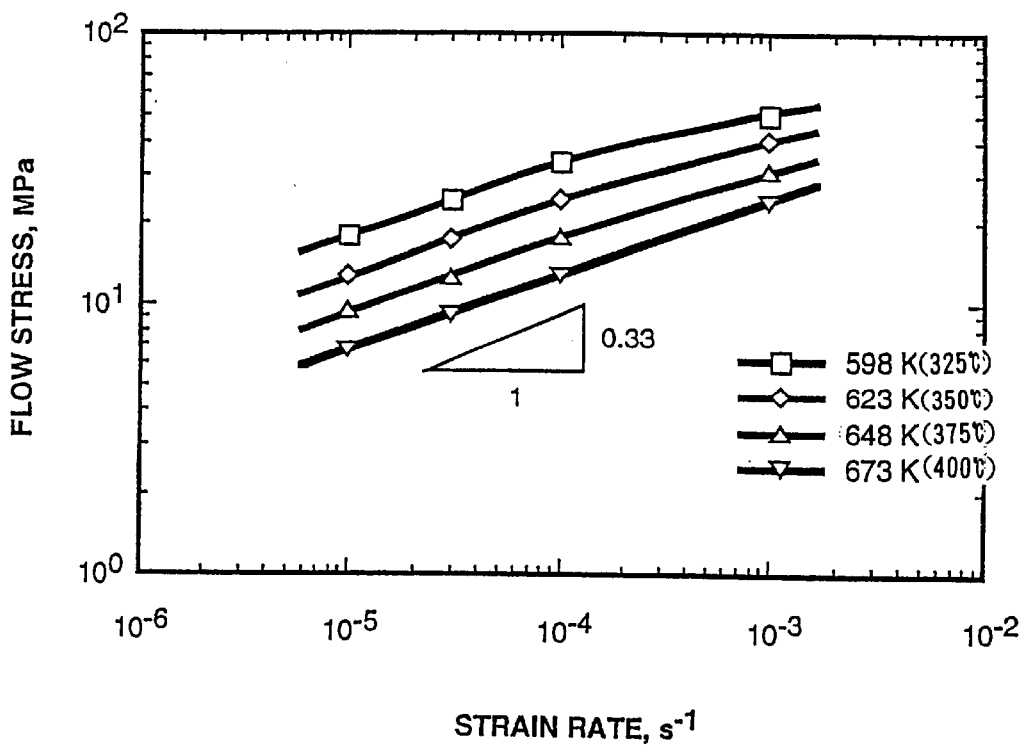
FIG. 4 is a graph showing a relationship strain rate and flow stress of the further magnesium alloy.

Between strain rate and elongation-to-failure, a relationship shown in FIG. 3 was likewise found by testing at 325–400° C. specimens of a magnesium alloy substantially composed of 2.9% of Al, 0.9% of Zn, 0.20% of Mn and a balance of Mg. This superplastic alloy had an average microcrystal diameter of about 100 μm. FIG. 4 shows a relationship between strain rate and flow stress, also detected at that temperature.

Similarly to the former case, elongation-to-failure decreased, with strain rate increasing as in FIG. 3. However, elongation of 130–170% observed for instance at $10^{-4}$ $sec^{-1}$ and at 350–400° C. does indicate good processibility. It will be apparent from FIG. 4 that the higher the temperature, the lower is the flow stress each strain rate, also giving good processibility.

The present invention will now be detailed further by way of some EXAMPLES given below.

Example #1

Kind of bolts: bolt with a hexagonal recess in head
Type: M8×30

A fine-granulated superplastic magnesium alloy having crystal diameter of about 10 μm was shaped into a rod 8 mm thick in diameter. This material was substantially composed of 3.1% of Al, 1.1% of Zn, 0.21% of Mn and a balance of Mg. The rod-shaped material was subjected to three step-forging process at 300–350° C. to prepare raw bolts. Each raw bolt then underwent a rolling step at this temperature to form a screw thread therein, thus giving a finished bolt. This bolt weighed about one fourth of a reference bolt of stainless steel (of the grade 'XM7'). Both the die and punch used in manufacture of such bolts did well withstand as many repeated uses as twice the twenty to thirty thousand times in usual cases.

Example #2

Kind of bolts: small screw with a cruciform recess in head
Type: M10×20

Another fine-granulated superplastic magnesium alloy having crystal diameter of about 100 μm and shaped into a rod 10 mm thick in diameter was used as a raw material of the screws. This material was substantially composed of 5.2% of Zn, 0.5% of Zr and a balance of Mg. Three step-forging process was carried out on the wire-shaped material at 350–400° C. to prepare raw screws. Each raw screw was then subjected at a similar temperature to a rolling step to form therein a thread, thus giving a finished screw.

Example #3

Kind of bolts: T-headed bolt
Type: M20×100

A still another fine-granulated superplastic magnesium alloy having crystal diameter of about 50 μm and shaped into a rod 20 mm thick in diameter was used as a raw material for making these bolts. This material was substantially composed of 6.5% of Al, 0.9% of Zn, 0.25% of Mn and a balance of Mg. Four step-forging process was carried out on the rod-shaped material at 250–300° C. to prepare raw bolts. Each raw bolt was then subjected to a rolling step at a similar temperature to form therein a screw thread, thus giving a finished bolt. This bolt weighed about one fourth of a reference bolt of stainless steel (of the grade 'SUS304'). A forming die that was used in manufacture of such bolts of the invention did also withstand repeated uses that were as more times as twice the twenty to thirty thousand times in the usual cases.

Example #4

A wire made of pure magnesium of industrial grade and having a diameter of 6 mm was used as a raw material of relatively small-sized screws 'M6×10' with cruciform recesses in heads. This raw material alloy having crystal diameter of about 100 μm was also of a fine-granulated texture and of a superplastic property, and 'three-step forged' at 350–400° C. Each raw screw was then subjected to a rolling step at a similar temperature to form therein a thread, thereby giving a finished screw.

Example #5

Used in this example was a 'pre-formed' wire 6 mm in diameter and made of a composite material comprising pure magnesium of industrial grade as a matrix and 30 wt. % of reinforcing glass fibers dispersed therein. This material, likewise fine-granulated in texture, superplastic in property but alloy having crystal diameter of about 10 μm, was processed also by the three step-forging at 250–300° C. to prepare raw small screws 'M6×10' each having a cruciform recess in head. Each raw screw was then rolled to form therein a thread, thus providing a finished screw.

Example #6

Kind of bolts: bolt with a hexagonal recess in head
Type: M8×10
Another fine-granulated superplastic magnesium alloy having crystal diameter of about 50 μm and shaped into a rod 8 mm thick in diameter was used as a raw material of this bolt. This material was substantially composed of 6.0% of Zn, 0.7% of Zr and a balance of Mg. Three step-forging process was carried out on the wire-shaped material at 300–350° C. to prepare raw screws. Each raw bolt was then subjected at a similar temperature to a rolling step to form therein a thread, thus giving a finished product.

Example #7

Kind of bolts: small screw with a cruciform recess in head
Type: M8×30
Still another fine-granulated superplastic magnesium alloy having crystal diameter of about 50 μm and shaped into a rod 8 mm thick in diameter was used as a raw material of this screw. This material was substantially composed of 5.0% of Zn, 0.75% of Zr and a balance of Mg. Two step-forging process was carried out on the wire-shaped material at 300–350° C. to prepare raw screws. Each raw bolt was then subjected at a similar temperature to a rolling step to form therein a thread, thus giving a finished product.

Example #8

Kind of bolts: small screw with a cruciform recess in head
Type: M10×30
A further magnesium alloy, also fine-granulated and superplastic, but having crystal diameter of about 30 μm and shaped into a rod 10 mm thick in diameter was used as a raw material for making this bolts. The further alloy was substantially composed of 9.0% of Al, 0.6% of Zn, 0.30% of Mn and a balance of Mg. Two step-forging process was carried out on the rod-shaped material at 250–300° C. to prepare raw bolts. Each raw bolt was then subjected to a rolling step at a similar temperature to thereby form a thread therein, thus giving a finished product.

Although the bolts and the small-sized screws have been exemplified above, they do not restrict the scope of the present invention that may also apply to nuts or the like articles.

In summary, tile fasteners provided herein and made of a magnesium-based material are lighter in weight and of an improved specific strength. Excellent forgeability of the raw materials used herein decreases the number of manufacture steps, reduces manufacture cost, and prolongs the life of the forming punch and die involved herein.

What is claimed is:
1. A threaded fastener having a shape made by a moderate temperature-forging process, from a raw material selected from the groupconsisting of pure magnesium of industrial grade, magnesium alloys all having a superplastic fine-granulated metallographic internal texture, first composite materials each comprising as a matrix thereof pure magnesium and second composite materials each comprising as a matrix thereof any of the magnesium alloys.

2. A threaded fastener having a shape made by a moderate temperature-forging process, from a raw material selected from the group consisting of pure magnesium of industrial grade, magnesium alloys all having a superplastic fine-granulated metallographic internal texture, first composite materials each comprising as a matrix thereof pure magnesium and second composite materials each comprising as a matrix thereof any of the magnesium alloys, wherein pure magnesium and each magnesium alloy are composed of microcrystals having an average diameter of 100 μm or less, and wherein the moderate temperature-forging is carried out at a temperature raised to fall within such a range of about 250–400° C. that superplasticity takes place.

3. A threaded fastener as defined in claim 1 or 2, wherein the magnesium alloys having the superplastic fine-granulated metallographic texture are each composed substantially of 1.0–12.0% by weight of Al, 0.3–2.5% by weight of Zn, 0.2–0.3% by weight of Mn, a balance of Mg and unavoidable impurities contained therein.

4. A threaded fastener as defined in claim 1 or 2, wherein the magnesium alloys having the superplastic fine-granulated metallographic texture are each composed substantially of 2.0–8.0% by weight of Zn, 0.1–1.0% by weight of Zr, a balance of Mg and unavoidable impurities contained therein.

5. A threaded fastener as defined in claim 1 or 2, wherein each of the first and second composite materials comprising as the matrix thereof pure magnesium or its alloys having the superplastic fine-granulated metallographic texture does comprise a reinforcing material dispersed in the matrix, the reinforcing material being selected from the group consisting of carbon fibers, glass fibers, metal whiskers, oxides, carbides, nitrides and the like.

6. A method of making a threaded fastener characterized in that a raw material used to make the fastener and having a superplastic fine-granulated metallographic texture is heated to a temperature at which the raw material shows superplasticity when the fastener is formed by a moderate temperature-forging process, wherein the raw material is selected from the group consisting of pure magnesium of industrial grade, magnesium alloys and composite materials each comprising a matrix, the matrix being selected from the group consisting of pure magnesium and the magnesium alloys.

7. A method of making a threaded fastener characterized in that a raw material used to make the fastener and having a superplastic fine-granulated metallographic texture is heated to a temperature at which the raw material shows superplasticity when the fastener is formed by a moderate temperature-forging process, wherein the raw material is selected from the group consisting of pure magnesium of industrial grade, magnesium alloys and composite materials each comprising a matrix, the matrix being selected from the group consisting of pure magnesium and the magnesium alloys, and wherein pure magnesium and each magnesium alloy are composed of microcrystals having an average diameter of 100 μm or less, and wherein the moderate temperature-forging is carried out at a temperature raised to fall within such a range of about 250–400° C. that superplasticity takes place.

8. A method of making a threaded fastener characterized in that a magnesium alloy as a raw material used to make the fastener and having a superplastic fine-granulated metallographic texture is heated to a temperature of 250–400° C. at which the magnesium alloy shows superplasticity when the fastener is formed by a moderate temperature-forging process, wherein the magnesium alloy is substantially composed of 1.0–12.0% by weight of Al, 0.3–2.5% by weight of Zn, 0.2–0.3% by weight of Mn, a balance of Mg and unavoidable impurities contained therein, and wherein the magnesium alloy is composed of microcrystals having an average diameter of 100 μm or less.

9. A method of making a threaded fastener characterized in that a magnesium alloy as a raw material used to make the fastener and having a superplastic fine-granulated metallographic texture is heated to a temperature of 250–400° C. at which the alloy shows superplasticity when the fastener is formed to by one of moderate temperature-forging process and hot forging process, wherein the magnesium alloy is substantially composed of 2.0–8.0% by weight of Zn, 0.1–1.0% by weight of Zr, a balance of Mg and unavoidable impurities contained therein, magnesium alloy are composed of microcrystals having an average diameter of 100 μm or less.

10. The method as defined in any one of claims 6 to 9, wherein the raw material as well as a forming punch are heated to 250–400° C.

* * * * *